United States Patent
Hughes et al.

(10) Patent No.: US 9,554,592 B2
(45) Date of Patent: Jan. 31, 2017

(54) BEVERAGES AND FOODSTUFFS RESISTANT TO LIGHT INDUCED FLAVOUR CHANGES, PROCESSES FOR MAKING THE SAME, AND COMPOSITIONS FOR IMPARTING SUCH RESISTANCE

(75) Inventors: Paul Shane Hughes, West Lothian (GB); Peter Blokker, Heerhugowaard (NL); Eric Richard Brouwer, Alphen Aan den Rijn (NL); Martinus Alewijn, Woudenberg (NL); Richard Van Der Ark, Emmen (NL)

(73) Assignee: Heineken Supply Chain B.V., Zoeterwoude (NL)

(*) Notice: Subject to any disclaimer, the term of this patent is extended or adjusted under 35 U.S.C. 154(b) by 1739 days.

(21) Appl. No.: 11/910,101

(22) PCT Filed: Mar. 28, 2006

(86) PCT No.: PCT/NL2006/050064
§ 371 (c)(1),
(2), (4) Date: Jan. 3, 2008

(87) PCT Pub. No.: WO2006/104387
PCT Pub. Date: Oct. 5, 2006

(65) Prior Publication Data
US 2008/0213442 A1 Sep. 4, 2008

(30) Foreign Application Priority Data
Mar. 29, 2005 (WO) ................ PCT/NL2005/000229

(51) Int. Cl.
C12C 5/02 (2006.01)
A23L 1/22 (2006.01)
A23L 3/3526 (2006.01)
A23L 2/58 (2006.01)
A23L 3/3544 (2006.01)

(52) U.S. Cl.
CPC ............... *A23L 3/3526* (2013.01); *A23L 2/58* (2013.01); *A23L 3/3544* (2013.01); *A23L 5/41* (2016.08); *C12C 5/02* (2013.01)

(58) Field of Classification Search
CPC .......... A23L 1/272; A23L 2/58; A23L 3/3526; A23L 3/3544; A23L 10/33; C12C 5/02; C12C 1/00; C12C 7/00; A23K 1/06; A23K 1/226; Y02P 60/87; C12H 1/00
USPC ....... 426/321, 330.3, 654, 592, 330.4, 11, 12
See application file for complete search history.

(56) References Cited

U.S. PATENT DOCUMENTS

| 2,198,221 A * | 4/1940 | Musher .......................... 426/14 |
|---|---|---|
| 4,389,421 A | 6/1983 | Palamand |
| 4,943,436 A * | 7/1990 | Ogden ............................ 426/16 |
| 5,064,659 A * | 11/1991 | Greenberg et al. ............... 426/3 |
| 5,405,624 A * | 4/1995 | Doncheck et al. ............. 426/11 |
| 5,618,572 A * | 4/1997 | Tripp et al. .................... 426/592 |
| 5,811,144 A | 9/1998 | Bordeleau et al. |
| 9,399,754 B2 * | 7/2016 | Kawamata ............. C12C 5/026 |
| 2001/0041199 A1 | 11/2001 | Davids |
| 2004/0086596 A1* | 5/2004 | Kawahara ....................... 426/11 |

FOREIGN PATENT DOCUMENTS

| JP | 2005015686 | * | 1/2005 |
|---|---|---|---|
| RU | 2209238 | * | 7/2003 |
| WO | 01/92459 | | 5/2001 |
| WO | 2005/030919 | | 4/2005 |

OTHER PUBLICATIONS

Kawashi. Derwent Abstract of JP-2005015686, Accessed on EAST.*
Kawasaki. Derwent Abstract of JP2005015684, Accessed on EAST.*
Kawasaki. Derwent Abstract of JP2005143465, Accessed on EAST.*
Kawasaki. Derwent Abstract of JP2006020526, Accessed on EAST.*
Kawasaki. Derwent Abstract of JP2005160402, Accessed on EAST.*
Kawasaki. STN Abstract of JP2005015684.*
Hida et al. Identification of beverages and beverage stains by GC/MS using aroma components as indicators. 1998. Int J Legal Med 111:13-16.*
RU2209238. Derwent Abstract in English. Accessed on EAST.*
Hafiza et al. 2014. Flavour generation during commercial barley and malt roasting operations: A time course study. Food Chemistry, 145:pp. 378-387.*

* cited by examiner

*Primary Examiner* — Jill Warden
(74) *Attorney, Agent, or Firm* — Foley & Lardner LLP; Sunit Talapatra

(57) ABSTRACT

One aspect of the present invention is concerned with a composition containing:
(A) at least 10 µg of particular substituted pyrroles per kg of dry matter; and
(B) at least 100 mg per kg of dry matter of a pyranone selected from the group consisting of maltol, 2,3-dihydro-3,5-dihydroxy-6-methyl-4H-pyran-4-one and combinations thereof;
which composition, when dissolved in water at a dry solids content of 0.1 wt. %, exhibits:
i. an absorption at 280 nm ($A_{280}$) that exceeds 0.01, preferably exceeds 0.05; and
ii. an absorption ratio $A_{280/560}$ of at least 100, preferably of at least 200. The present composition can advantageously be used as an additive in beverages or foodstuffs to prevent or reduce light induced flavor changes. The invention also encompasses a process for the manufacture of the aforementioned composition.

35 Claims, No Drawings

BEVERAGES AND FOODSTUFFS RESISTANT TO LIGHT INDUCED FLAVOUR CHANGES, PROCESSES FOR MAKING THE SAME, AND COMPOSITIONS FOR IMPARTING SUCH RESISTANCE

TECHNICAL FIELD OF THE INVENTION

The present invention relates to beverages and foodstuffs having heightened resistance to light induced flavour changes and to compositions that can be used advantageously as an additive in beverages or foodstuffs to prevent or reduce light induced flavour changes. The present light stabilising composition is particularly suitable for use in beverages or foodstuffs that are prone to developing an off-flavour as a result of exposure to light, and especially in such beverages or foodstuffs that are not adequately protected from the detrimental impact of light by their packaging.

The present invention also includes processes for the manufacture of such compositions, and processes for making the improved beverages and foodstuffs, using the compositions according of the invention.

BACKGROUND OF THE INVENTION

Light induced off-flavour formation is a well known problem in the beverage and food industry. A variety of off-flavour generating reactions that are incited or accelerated by exposure to light have been described in the scientific literature. The rate at which these off-flavour generating reactions progress is usually increased dramatically by exposure to light with a wavelength below 500 nm, particularly UV-light.

Light sensitive flavour changes in beverages and foodstuffs may be inhibited effectively by packaging these beverages or foodstuffs in a material that will not transmit light frequencies that promote off-flavour generating reactions. However, for a variety of reasons it is sometimes desirable to employ a packaging material that does not exhibit this light shielding quality. In those cases, the composition of the beverage or foodstuff will need to be optimised to achieve sufficient stability against light induced flavour changes. Where this cannot be achieved with the usual constituents of such beverages or foodstuffs, special light stabilising additives may be used.

It is known in the art to employ a large variety of additives for the stabilisation of beverages and food products against light induced off-flavour formation. Many of these additives derive their effectiveness from their capability to inhibit off-flavour generating reactions, e.g. by scavenging of one or more of the reactants and/or key intermediates. In addition, additives have been proposed that scavenge the off-flavour causing reaction products (e.g. by forming a non-volatile complex) or that promote degradation of these reaction products to less flavour active products.

Instead of minimising the impact of light induced off-flavour generating reactions as described above, it is also possible to prevent these reactions from occurring by introducing an additive that neutralises the undesired impact of said light and particularly the ultraviolet component of said light. U.S. Pat. No. 5,948,458 describes a method for the prevention of spoilage, rancidity or off-color in a liquid food product containing unsaturated lipids and fats caused by exposure of the liquid food product to ultraviolet light comprising the step of adding to said food product an ultraviolet absorbing effective amount of tricalcium phosphate.

U.S. Pat. No. 4,389,421 teaches the addition of organic compounds containing 1,8-epoxy groups, such as 1,8-cineole, to prevent or significantly reduce light struck flavour in malt beverages. It is hypothesised therein that the addition of 1,8-epoxy compounds to malt beverages prevents the formation of methyl butenyl mercaptan by preventing cleavage of a five carbon fragment (iso-pentenyl chain) from the iso-hexenoyl side chain of iso-α-acids, which fragments would otherwise react with the sulfhydryl group forming the iso-pentenyl mercaptan (methyl butenyl mercaptan). It is stated that the 1,8-epoxy compounds may prevent formation of methyl butenyl mercaptan by reacting with the iso-pentenyl fragment or by protecting the iso-hexenoyl side chain from fragmenting or by blocking the sulfhydryl group from reacting with the iso-pentenyl fragment.

Many food additives that have been proposed for stabilising beverages or foodstuffs against light induced off-flavour formation have to be labelled as chemical entities on the product package. With a view to consumer acceptance manufacturers of beverages and foodstuffs generally do not like to use such chemical or artificial additives but, instead, prefer to employ additives that make more appealing ingredient labels (consumer-friendly labels) possible and that deliver similar functionality.

SUMMARY OF THE INVENTION

The inventors have discovered that compositions containing significant levels of Maillard reaction products can be used advantageously as additives in beverages and foodstuffs to protect these against light induced flavour changes, especially if these compositions have been decoloured before being employed as additives. Thus, the present invention provides a composition that contains substantial levels of Maillard reaction products, including substituted pyrroles and substituted pyranones (e.g. maltol), which composition is further characterised in that it combines a high absorption of UV-radiation (at 280 nm) with a low absorption of visible light at 560 nm.

The Maillard reaction, also called non-enzymatic browning, is a complex cascade of reactions involving carbonyl and amino compounds, such as reducing sugars and amino acids. The reaction between sugars and amino groups was first described in 1908 by two Englishmen, Ling & Malting, who considered colour formation in beer. In 1912 Louis-Camille Maillard described a browning reaction between reducing sugars and amino groups. Despite not being the first to report the reaction, Maillard was the first to realise the significance of the reaction in areas as diverse as plant pathology, geology and medicine. In food technology the Maillard reaction plays a central role in the development of colour, aroma, flavour, texture and nutritional value of cooked and processed foods.

Compositions containing significant amounts of Maillard reaction products are well-known in the art, particularly in the field of flavourings. These known compositions typically exhibit an intense brown colour due to the presence of so called melanoidins, i.e. brown nitrogenous polymers and copolymers that are end products of the Maillard reaction. Furthermore, these known compositions typically exhibit an absorption ratio $A_{280/560}$ well below 100.

It is an essential aspect of the light stabilising composition of the present invention that the level of melanoidins in said composition has been substantially reduced whilst retaining the low molecular Maillard reaction products that are believed to prevent light induced flavour changes. Thus, the present composition typically has an absorption ratio $A_{280/560}$ of at least 100.

The Maillard reaction products contained in the present composition are capable of absorbing UV-radiation. Maltol, for instance has an UV absorption maximum at 274 nm and 3,5-dihydroxy-6-methyl-2,3-dihydropyranone at 296 nm. 2-Acetylpyrrol has an UV absorption maximum at 290 nm and both pyrrole-2-aldehyde and 5-hydroxymethyl-1-(3-methyl-butyl)-1H-pyrrole-2-carbaldehyde have an UV-absorption maximum at 293 nm. Although the inventors believe that the advantageous properties of the present composition are mainly associated with the UV-absorbing properties of Maillard reaction products, it is possible that these protective properties are partially derived from other intrinsic qualities of these substances.

DETAILED DESCRIPTION OF THE INVENTION

Accordingly, one aspect of the present invention is concerned with a composition containing
(A) at least 10 μg of substituted pyrroles per kg of dry matter, said substituted pyrroles being represented by the following formula I:

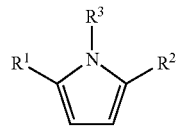

wherein $R^1$ represents an optionally oxygenated hydrocarbyl comprising 1-6 carbon atoms; $R^2$ represents hydrogen or an optionally oxygenated hydrocarbyl comprising 1-6 carbon atoms; and $R^3$ represents hydrogen or a linear or branched $C_1$-$C_5$ alkyl residue;
and
(B) at least 100 mg per kg of dry matter, preferably at least 500 mg per kg of dry matter of a pyranone selected from the group consisting of maltol, 2,3-dihydro-3,5-dihydroxy-6-methyl-4H-pyran-4-one (DDMP) and combinations thereof; which composition, when dissolved in water at a dry solids content of 0.1 wt. %, exhibits:
  i. an absorption at 280 nm ($A_{280}$) that exceeds 0.01, preferably exceeds 0.05; and
  ii. an absorption ratio $A_{280/560}$ of at least 100, preferably of at least 200.

The formation of the Maillard reactions products B (maltol and DDMP) is dependent on the reaction conditions employed. It is feasible to manipulate the reaction conditions in such a way that large quantities of maltol are formed, but only minute amounts of DDMP and vice versa. Both compositions containing significant levels of maltol and compositions containing significant levels of DDMP can advantageously be employed in accordance with the invention.

An important characteristic of the light stabilising composition according to the invention is its relatively high absorption of UV light in the range of 250-400 nm and especially in the range of 250-350 nm. The absorbance at 280 nm, i.e. $A_{280}$, is a good measure for this particular quality. Typically, the present composition exhibits an $A_{280}$ that exceeds 0.05, preferably exceeds 0.1 and most preferably exceeds 0.3. The $A_{280}$ is determined relative to % solids as described herein below under "Colour intensity", except that the absorbance is measured at 280 nm instead of 610 nm.

Another important characteristic of the present composition is the absorption ratio $A_{280/560}$. The light stabilising composition combines a relatively high absorption of UV light, particularly at wavelengths in the range of 250 to 400 nm, with a relatively low absorption of visible light, as demonstrated by a ratio of the light absorption at wavelengths 280 nm and 560 nm ($A_{280/560}$) of at least 100, preferably of at least 200. More preferably, the present composition has an absorption ratio $A_{280/560}$ of at least 250, more preferably of at least 400, even more preferably of at least 500 and most preferably of at least 1000.

The term "wavelength" as used in here, refers to a wavelength of light, unless indicated otherwise. Whenever reference is made in here to "absorption", unless indicated otherwise, this refers to absorption of light.

The present composition is particularly effective in imparting light stabilising properties if it contains substituted pyrroles in a concentration of at least 50 μg/kg, more preferably at least 250 μg/kg, and most preferably at least 1000 μg/kg. The concentration of maltol and/or DDMP in the present composition advantageously is 100 mg/kg, preferably at least 200 mg/kg, more preferably at least 500 mg/kg and most preferably at least 2,000 mg/kg.

Other Maillard reaction product that may be found in significant amount in the present composition include substituted furans represented by the following formula:

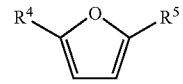

wherein $R^4$ represents an optionally oxygenated hydrocarbyl comprising 1-6 carbon atoms and $R^5$ represents hydrogen. Typically the concentration of said substituted furans in the present composition is at least 100 mg/kg, preferably at least 150 mg/kg and most preferably at least 250 mg/kg. In accordance with a particularly preferred embodiment the substituted furan represents 5-hydroxymethyl-furfural.

In a preferred embodiment of the invention the substituted pyrroles are represented by the above formula I, wherein $R^1$ represents an oxygenated hydrocarbyl comprising 1-6, preferably 1-4 carbon atoms. Even more preferably, $R^1$ represents an oxo-substituted hydrocarbyl residue comprising 1-3, preferably 1-2 carbon atoms. According to a yet more preferred embodiment, $R^1$ represents —(CO)CH$_3$ or —CHO.

According to another preferred embodiment, $R^2$ in formula I represents hydrogen, $C_1$-$C_2$ alkyl or an oxygenated hydrocarbyl comprising 1-2 carbon atoms. More preferably, $R^2$ represents hydrogen, methyl, CH$_2$OH or CHO. Even more preferably, $R^2$ represents hydrogen, methyl or CH$_2$OH. According to one particularly preferred embodiment, $R^2$ represents hydrogen. According to another particularly preferred embodiment, $R^2$ represents CH$_2$OH.

$R^3$ preferably represents hydrogen, methyl or —CH$_2$CH$_2$CH(CH$_3$)CH$_3$. According to one particularly preferred embodiment, $R^3$ represents hydrogen. According to another particularly preferred embodiment, $R^3$ represents —CH$_2$CH$_2$CH(CH$_3$)CH$_3$. According to yet another preferred embodiment, $R^3$ represents methyl.

In accordance with a particularly preferred embodiment the substituted pyrrole is selected from the group consisting of 2-acetylpyrrole, pyrrole-2-carboxaldehyde, methyl-pyrrole-2-carboxaldehyde, 5-hydroxymethyl-1-(3-methyl-butyl)-1H-pyrrole-2-carboxaldehyde and combinations thereof. In one advantageous embodiment, the substituted pyrrole is 2-acetylpyrrole. In another, equally advantageous embodiment, the substituted pyrrole is 5-hydroxymethyl-1-(3-methyl-butyl)-1H-pyrrole-2-carbaldehyde.

In yet another preferred embodiment the present composition contains at least 100 mg, preferably at least 1,000 mg, more preferably at least 5,000 mg, even more preferably at least 10,000 mg and most preferably at least 20,000 mg of 2,3-dihydro-3,5-dihydroxy-6-methyl-4H-pyran-4-one (DDMP) per kg of dry matter.

In a further preferred embodiment of the invention, the light-stabilising composition contains at least 100 mg, preferably at least 500 mg, more preferably at least 1,000 mg and most preferably at least 2,000 mg of maltol per kg of dry matter.

The amount of 5-hydroxymethyl-1-(3-methyl-butyl)-1H-pyrrole-2-carbaldehyde contained in the present light stabilising composition preferably is at least 1 μg, more preferably at least 3 μg, even more preferably at least 6 μg and most preferably at least 10 μg per kg of dry matter. The inventors have observed that 5-hydroxymethyl-1-(3-methyl-butyl)-1H-pyrrole-2-carbaldehyde is particularly effective in inhibiting the formation of sunstruck off-flavour.

The light stabilising properties of the present composition are particularly appreciated in case the composition comprises both the substituted furans and maltol/DDMP in the indicated amounts.

The present light stabilising composition is suitably prepared starting from a reaction mixture that contains reducing sugar. Since normally some of the reducing sugar will remain unreacted, the present composition typically contains at least 0.1% of reducing sugars by weight of dry matter. Preferably, the present composition contains at least 0.5%, more preferably at least 1% and most preferably at least 3% of reducing sugars by weight of dry matter.

The present composition usually also contains a certain amount of 1-amino-1-deoxy-2-ketoses (Amadori rearrangement products). These substances are formed during the initial stages of the Maillard reaction. Typically, the present composition contains at least 10 μg per kg of dry matter of 1-amino-1-deoxy-2-ketoses. Most preferably, the compositions contains at least 100 μg per kg of dry matter of ketoses.

The present composition is suitable for stabilising a wide variety of beverages and food products against light induced flavour changes. Best results, however, are obtained in water containing food products, particularly water-continuous food products. In order to avoid that the use of the present composition in these products will cause precipitation, it is preferred that the present stabilising composition is essentially completely water soluble. Preferably, the present composition is essentially completely water soluble up to a dry solids content of at least 0.01 wt. %, more preferably up to a dry solids content of at least 0.05 wt. %, most preferably up to 0.1 wt. %.

As mentioned herein before the present light stabilising composition preferably contains not more than minor amounts of the melanoidins. Melanoidins are relatively large molecules that can suitably be removed after completion of the Maillard reaction by means of filtration or another separation technique that enables separation on the basis of molecular weight, size, hydrophobicity or charge. The resulting composition typically contains less than 30%, preferably less than 20%, more preferably less than 15%, even more preferably less than 10% and most preferably less than 5%, by weight of dry matter, of components having a molecular weight in excess of 30 kDa. More particularly, the aforementioned amounts relate to the components having a molecular weight in excess of 10 kDa, even more particularly in excess of 5 kDa and most particularly in excess of 1 kDa. The amount of components with a molecular weight in excess of 30 kDa contained in the present composition is determined by passing an aqueous solution of said composition over a Millipore® YM30 filter. Millipore® YM10 and YM1 filters may be used to determine contents of components with a molecular weight in excess of 10 kDa and 1 kDa respectively. It is noted that different techniques for determining the content of high molecular components may yield different results. Therefore, it should be understood that the kDa numbers recited within this application are defined in relation to the methodology described above.

The reduced level of melanoidins and other colour contributing substances is also evident by a low colour intensity, particularly at wavelengths around 600 nm. In a particularly preferred embodiment of the invention, the present light stabilising composition has a colour intensity at 610 nm that does not exceed 0.024, preferably does not exceed 0.01 as calculated herein. Even more preferably, said colour intensity does not exceed 0.003 as calculated herein. A suitable method for determining the colour intensity at 610 nm is described below.

The present composition is advantageously provided in a relatively concentrated form, e.g. with a solids content of at least 10 wt. %. More preferably, the solids content is at least 20 wt. %, most preferably at least 30 wt. %. The present composition may take the form of a liquid, a syrup, a paste, a powder, granules or tablets. Preferably, the present composition contains less than 80 wt. %, more preferably less than 70 wt. % water.

The light stabilising composition according to the invention may suitably include additives such as anti-oxidants, emulsifiers and carrier materials. Preferably, however, the present composition does not contain any ingredients that are not considered "natural", i.e. that need to be labelled as "artificial", "synthetic" or "chemical". Furthermore, the present composition preferably contains less than 10%, more preferably less than 5% caramel or decoloured caramel, by weight of dry matter. In addition, the present composition preferably contains less than 0.3%, more preferably less than 0.1% by weight of dry matter of a fructosazine selected from the group consisting of 2,5-deoxyfructosazine, 2,6-deoxyfructosazine, 2,5-fructosazine, 2,6-fructosazine and combinations thereof.

The inventors have observed that particularly good results are obtained if the present light stabilising composition contains at least 30%, preferably at least 50% cereal derived matter by weight of dry matter. In accordance with a particularly preferred embodiment, the cereal derived material is derived from a cereal selected from the group of barley, wheat, rice, rye, maize, sorghum and combinations thereof. Even more preferably the material is derived from cereal selected from the group of barley, wheat, rye and combinations thereof, barley being most preferred.

Another aspect of the present invention is concerned with the use of the present light stabilising composition as an additive to prevent or reduce light induced flavour changes in beverages or foodstuffs. Typically, the present composition is introduced into the beverage or foodstuff in an amount of at least 0.01 wt. %, preferably of at least 0.02 wt. % and more preferably of at least 0.03 wt. %, calculated on the basis of the amount of dry matter introduced. Typically the amount introduced will not exceed 1 wt. %, preferably it will not exceed 0.5 wt. %, more preferably it will not exceed 0.3 wt. %, again calculated on the basis of the amount of dry matter introduced.

According to a particularly preferred embodiment the present light stabilising composition is added to beer, preferably before fermentation. The composition may be added prior to, during or after wort boiling. Preferably, the composition is added during or after wort boiling.

The present composition is particularly suitable for preventing light induced flavour changes in beverages and foodstuffs that contain significant quantities of riboflavin, which substance can act as a photo-initiator. The composition is particularly advantageously used in beverages and foodstuffs that contain at least 10 µg/kg (ppb) riboflavin, more preferably at least 50 µg/kg riboflavin and most preferably at least 100 µg/kg riboflavin.

The benefits of the present light stabilising composition are particularly pronounced if said composition is used to stabilise bottled beverages. The term "bottled beverage" encompasses beverages in glass containers (e.g. bottles, jars etc.) as well as beverages in light-transparent plastics, such as plastics based on polyethylene (e.g. polyethylene (PE), polyethylene teraphthatate (PET) and/or polyethylene naphthalate PEN)); polycarbonate; PVC; and/or polypropylene. In a particularly preferred embodiment, the present light stabilising composition is used as an additive, particularly a light stabilising additive, in beverages bottled in green, clear (e.g. flint) or blue glass. Most preferably, it is used as an additive in beverages bottled in green or clear glass.

The present invention encompasses the use of the light stabilising composition in a wide variety of beverages, including beer, soft drinks, liquor, juices, dairy drinks etc. In a particularly preferred embodiment, the composition is used to prevent or reduce light induced flavour changes in malt beverages, such as beer, ale, malt liquor, porter, shandy, and others which are made from or contain fermented extracts of malt. The present light stabilising composition is particularly advantageously employed to improve light stability of beer, more preferably of relatively pale beer, e.g. beer with an EBC colour value of less than 25, more preferably of less than 15, most preferably of less than 12. A suitable method for determining the EBC colour value is described below.

It is well known in the brewing industry that exposure of brewed beverages, such as lager, ale, porter, stout and the like (herein generically referred to as "beer"), to sunlight or artificial light, has a detrimental effect on the sensory quality of these beverages. To be more precise, exposure to light is known to cause the development of the so-called "skunky" flavour, which is sometimes also referred to as "sunstruck" or "light struck" flavour. In general, sunstruck formation in beer is promoted particularly strongly by light with a wavelength of 250-550 nm. In general it can be said, the shorter the wavelength the higher the rate at which sunstruck flavour is formed.

It is believed that volatile sulphur-containing compounds are responsible for the sunstruck flavour. These sulphur-containing compounds are thought to be formed at least in part by reaction of other sulphur-containing compounds with photochemically degraded hop components in the beverage. Extremely small quantities of these sulphur compounds are sufficient to impart a sunstruck flavour to a beverage and to render it less acceptable for the consumer (cf. for example Kirk-Othmer, Encyclopedia of Chemical Technology, $4^{th}$ Ed., Vol. 4, pages 22-63, 1992 and U.S. Patent Application No. 2002/0106422).

The photochemical reaction leading to the sulphur-containing substances that cause sunstruck flavour, is believed to be assisted by the presence of riboflavin. Riboflavin can act as a photo initiator in a beverage and is present in beer in significant quantities. Riboflavin in beer emanates mainly from the malt used therein. To a lesser extent also hops and the action of yeast during the fermentation can contribute to the riboflavin content of beer (cf. for example "Kinetics of Riboflavin Production by Brewers Yeast" by Tamer et al., pages 754-756 Enzyme Microb. Technology, 1988, Vol. 10, December).

In order to solve the sunstruck problem it has been proposed to reduce the amount of riboflavin in the beer ("Sunstruck Flavour Formation in Beer" by Sakuma et al. ASBC Journal). Removal of riboflavin can be accomplished by decomposition. e.g. by using actinic radiation (U.S. Pat. No. 3,787,587, U.S. Pat. No. 5,582,857 and U.S. Pat. No. 5,811,144). The amount of riboflavin present in the beer may also be reduced by treating the beer with absorbent clay (U.S. Pat. No. 6,207,208) or by co-fermenting with a combination of yeast and *Leuconostoc mesenteroides* (U.S. Pat. No. 6,514,542). It has also been suggested to use immobilised riboflavin-binding protein to remove riboflavin or to add said protein to a beverage to inactivate riboflavin (EP-A 0 879 878). The present light stabilising composition is particularly effective in preventing the development of sunstruck flavour in beer, especially in beer that is stored in a container that is transparent to light, particularly a container that is transparent to light with a wavelength in the range of 330-360 nm, more particularly a container that is transparent to a wider spectrum of light within the range of 320-400 nm.

A principal source of the sunstruck flavour in beer is 3-methyl-2-butene-1-thiol (3-MBT). The sensory threshold value for this substance in water is only a few ng/kg (ppt). 3-MBT is believed to be formed by the reaction between light excited riboflavin (largely originating from the malt component) and the bittering principles in beer, the iso-α-acids, which originate mainly from hop. The use of the present light stabilising composition in an effective amount to inhibit light induced flavour changes is evident by a reduction in the rate of 3-MBT formation by at least 30%, preferably by at least 50%, more preferably at least 60%, even more preferably at least 70% and most preferably by at least 80%.

The present invention also provide a method of manufacturing a beverage or a foodstuff that is resistant to light induced flavour changes, which method comprises introducing the light stabilising composition as described above. In one preferred embodiment the aforementioned method comprises introducing into the beverage or foodstuff the light stabilising composition in an amount of between 0.01 and 5 wt. %, preferably of between 0.02 and 3 wt. %, calculated on the basis of the amount of dry matter introduced.

Furthermore, the present invention encompasses a beverage or foodstuff that is resistant to light induced flavour changes and that has been obtained by such a method.

Another aspect of the invention relates to a hop containing beverage exhibiting an EBC colour value of less than 25, preferably of less than 15, more preferably of less than 12, comprising at least at least 0.3 µg/l of substituted pyrroles as defined herein before and at least 300 µg/l maltol and/or DDMP. Stability against light induced flavour changes is particularly effectively realised if the hop containing beverage contains at least 1 µg/l, more preferably at least 5 µg/l and most preferably at least 20 µg/l of substituted pyrroles. Likewise the said beverage preferably contains at least 1 mg/l, more preferably at least 3 mg/l and most preferably at least 6 mg/l maltol and/or DDMP.

According to a particularly preferred embodiment, the present hop containing beverage comprises at least 5 mg/l, preferably at least 10 mg/l, more preferably at least 20 mg/l of maltol.

According to a further preferred embodiment the hop containing beverage comprises at least 40 mg/l, preferably at least 60 mg/l of 2,3-dihydro-3,5-dihydroxy-6-methyl-4H-pyran-4-one.

According to yet another preferred embodiment, the hop containing beverage comprises at least 5 ng/l, preferably at least 10 ng/l, more preferably at least 25 ng/l of 5-hydroxymethyl-1-(3-methyl-butyl)-1H-pyrrole-2-carbaldehyde.

The concentrations of maltol, 2,3-dihydro-3,5-dihydroxy-6-methyl-4H-pyran-4-one and/or 5-hydroxymethyl-1-(3-methyl-butyl)-1H-pyrrole-2-carbaldehyde in the beverages and compositions according to the present invention may suitably be determined by means of the analytical methods described below under the heading "Methods".

Preferably, the hop containing beverage is a fermented cereal based beverage. More preferably, the hop containing beverage is beer, malt liquor, porter, shandy, or another beverage made from or containing extracts of hop. Even more preferably, the beverage is beer, most preferably lager beer. In a particularly preferred embodiment, the hop containing beverage has a yellow or yellowish colour, i.e. it does not have a brownish colour associated with the use of significant amounts of colouring caramel.

As explained herein before, the benefits of the present light stabilising composition will be particularly apparent in light sensitive products that have been packaged in containers that are transparent to light with a wavelength of less than 500 nm, especially less than 400 nm, e.g. green, clear and blue glass. Consequently, in a preferred embodiment, the present hop containing beverages is bottled in green, clear or blue glass, especially in clear or green glass.

Yet another aspect of the present invention relates to a process for the manufacture of a composition that may suitably be used as an additive to improve the stability of beverages or foodstuffs against light induced flavour changes, said process comprising:
    providing a Maillard reaction mixture containing:
        0.3-35 wt. % of amino compounds selected from the group consisting of amino acids, peptides, proteins and combination thereof;
        10-90 wt. % of carbohydrates, said carbohydrates including, calculated by weight of the reaction mixture, 0.5-80 wt. % of one or more reducing sugars selected from the group consisting of maltose, isomaltose, maltotriose, glucose and fructose; and
        0-20 wt. % water;
wherein at least 20 wt. % of the dry components contained in the reaction mixture are cereal derived;
    heating said Maillard reaction mixture to a temperature (T) of at least 80° C. during a period (P) at least 10 seconds to obtain a reaction product that, when dissolved in water at a dry solids content of 0.1 wt. %, exhibits an absorption at 560 nm of at least 0.1; and
    decolourising said reaction product to increase its absorption ratio $A_{280/560}$ by at least 100%.

According to a particularly preferred embodiment, the Maillard reaction mixture contains at least 50% by weight of dry matter of brewing adjuncts, including at least 30% by weight of dry matter, preferably at least 50% by weight of dry matter of cereal selected from the group of barley, wheat, rice, rye, maize, sorghum and combinations thereof.

Typically, the combination of amino compounds and carbohydrates constitutes at least 60 wt. % of the dry matter contained in the Maillard reaction mixture. Preferably both the amino compounds and carbohydrates are cereal derived.

The heating conditions employed to incite Maillard reactions preferably meet the following requirement: $4,000 \leq P \times 1.5^{(T-70)/10} \leq 2,000,000$; P being expressed in seconds and T in 0° C.

It is an essential aspect of the present process that the heat-induced Maillard reactions results in a significant browning of the reaction product. Thus, in accordance with a preferred embodiment, the reaction product obtained after heat treatment when dissolved in water at a dry solids content of 0.1 wt. %, exhibits an absorption at 560 nm of at least 0.3, more preferably of at least 1.0.

Decolourisation of the reaction product in accordance with the present invention results in a substantial decrease of the absorption at 560 nm, whereas the UV-absorption characteristics remain largely unaltered. Thus, in accordance with a particularly preferred embodiment, the reaction product obtained after heat treatment is decolourised to increase its absorption ratio $A_{280/560}$ by at least 300%.

The present process will usually produce a considerable yield in the form of the present light stabilising composition. Typically, the yield of the present process is in the range of 5-90%, especially in the range of 10-80%. In a particularly preferred embodiment the present process yields a light stabilising composition in accordance with the present invention in a yield of at least 20%.

Methods

Solids Content

The solids content of a material is determined by drying a sample upon a carrier composed of pure quartz sand that passes a No. 40 but not a No. 60 sieve and has been prepared by digestion with hydrochloric acid, washed acid-free, dried and ignited. Mix 30.0 g of prepared sand accurately weighed with 1.5-2.0 g accurately weighed material and dry to constant weight at 60° C. under reduced pressure 50 mm Hg (6.7 kPa). Record the final weight of the sand plus caramel or decolourised caramel. Calculate the % solids as follows:

$$\% \text{ solids} = \frac{(w_F - w_S)}{w_C} \times 100$$

where
$w_F$=final weight of sand plus caramel
$w_S$=weight of sand
$w_C$=weight of caramel initially added Colour Intensity For the purpose of this specification, Colour Intensity of a certain material is defined as the absorbance of an 0.1% (w/v) solution of solids in water in a 1 cm quartz cell at 610 nm. If necessary, pH of the solution is adjusted to between 4 and 7.

Procedure

Transfer an amount of material equivalent to 100 mg solids into a 100 mL volumetric flask, dilute to volume with water, mix and centrifuge if the solution is cloudy. Determine the absorbance of the clear solution in a 1 cm quartz cell at 610 nm with a suitable spectrophotometer previously standardized using water as a reference. Calculate the Colour Intensity of the material as follows:

$$\text{Colour intensity} = \frac{A_{610} \times 100}{\% \text{ solids}}$$

Determine % solids as described under Solids content.

Classification/Absorbance Ratio

For the purposes of this specification, Absorbance Ratio of a material is defined as the absorbance of an 0.1% (w/v) solution of solids in water at 280 nm divided by the absorbance of the same solution at 560 nm. If necessary, pH of the solution is adjusted to between 4 and 7.

Procedure

Transfer an amount of material equivalent to 100 mg solids into a 100 mL volumetric flask with the aid of water, dilute to volume, mix and centrifuge if solution is cloudy. Pipet a 5.0 mL portion of the clear solution into a 100 mL volumetric flask, dilute to volume with water, and mix. Determine the absorbance of the 0.1% (w/v) solution in a 1-cm cell at 560 nm and that of the 1:20 (v/v) diluted solution at 280 nm with a suitable spectrophotometer previously standardized using water as reference. (A suitable spectrophotometer is one equipped with a monochromator to provide a bandwidth of 2 nm or less and of such quality that the stray-light characteristic is 0.5% or less.) Calculate the Absorbance Ratio by first multiplying the absorbance units at 280 nm by 20 (dilution factor) and by dividing the result of the multiplication by the absorbance units at 560 nm.

EBC Colour

EBC recommended method (European Brewery Convention, *Analytica*, 1987), whereby absorbance of light is measured at 430 nm in a 1 cm quartz cuvette, against water as the reference. The absorbance value measured is multiplied by an empirically derived factor of 25, to give a colour value in terms of EBC colour units. $EBC = A_{430} \times 25$.

Determination of
3-dihydro-3,5-dihydroxy-6-methyl-4H-pyran-4-one

Analysis is performed on a Waters Alliance 2695 HPLC system with Waters Diode array 2996 detector, scanning between 210-500 nm, using Millennium 32 software. Column used: Discovery HS C18 (5 µm, 250×4.6 mm) column from Supelco (cat no: 568523-U).

Chromatographic Conditions:
  Gradient: 90% A, 0'-17'; 40% A, 25'-30'; 90% A 35'-45'.
  Solvent A: 0.05% (v/v) aqueous solution of formic acid (Milli-Q plus water, adjusted to pH 3 with formic acid (98-100%, Riedel-de-Haën, cat no: 27001)
  Solvent B: Acetonitrile (Sigma-Aldrich, cat no: 34998)
  Run-time 45 minutes
  Flow-rate 0.3 ml/min
  Sample temperature: 8° C.
  Column temperature: 20° C.
  Degassing: Continuous
  Samples prepared by 1:2 (v/v) dilution with solvent A Under these conditions, 3-dihydro-3,5-dihydroxy-6-methyl-4H-pyran-4-one elutes after 14 minutes Determination of maltol and 5-hydroxymethyl-1-(3-methyl-butyl)-1H-pyrrole-2-carbaldehyde Maltol and 5-hydroxymethyl-1-(3-methyl-butyl)-1H-pyrrole-2-carbaldehyde are determined by SBSE/GC/MS (Stir Bar Sorptive Extraction/Gas Chromatography/Mass Spectroscopy). After conditioning (30 min 280° C.) a Gerstel Twister™, 0.5 mm film thickness and 10 mm length is equilibrated in 30.0 g of sample (e.g. beer) for 45 minutes at room temperature. The twister is then desorbed in a Gerstel TDU (Thermo Desorption Unit), programmed at 40° C. initial temperature (0.50 minutes), then at 240° C./min to 260° C. The CIS (Cooled Injection System) was set at −20° C., and on injection heated to 280° C. at 12°/sec.

The GC system consists of an Agilent 6890A GC, equipped with a Chrompack capillary column CP-Sil 8 CB Low Bleed/MS, 50 m, 0.25 mmID and 0.25 µm film thickness. The oven is operated at 50° C. for 2 minutes, and then raised at 10° C./min to 300° C. Helium is used as carrier gas, at 1.5 mL/min, constant flow. An Agilent 5973 Mass Selective Detector is used for detection, operated at EI 70 eV, scanning from 33 to 300 m/z. Maltol, eluting at 11.5 min, is quantified comparing its signal at 126 m/z with an earlier recorded calibration curve. 5-Hydroxymethyl-1-(3-methyl-butyl)-1H-pyrrole-2-carbaldehyde, eluting at 11.5 min, is quantified comparing its signal at 195 m/z with an earlier recorded calibration curve.

EXAMPLES

Example 1

Light stabilizing compositions according to the present invention were prepared from a range of crystal barley malts. These crystal barley malts were prepared on a pilot scale, applying the heating and roasting conditions recited in Table 1.

TABLE 1

|  | Stewing conditions | Roasting conditions |
| --- | --- | --- |
| Barley 1 | 1 hour at 70° C. | 1 hour at 135° C. |
| Barley 2 | 1 hour at 70° C. | 1 hour at 150° C. |
| Barley 3 | 1 hour at 70° C. | 1 hour at 180° C. |

In addition, light stabilizing compositions were prepared from chocolate rye, caramel rye and caramel wheat malts that were provided by Weyermann specialty malting company (Bamberg, Germany).

The aforementioned malts as well as a conventional production malt (light malt) were further prepared by grinding 100 g of the malt sample with 300 ml water. The light malt was employed as a reference sample.

The resulting suspensions were centrifuged and paper filtered. The supernatants were acidified to pH 4.2 (0.3M HCl). The resulting filtrates were ultrafiltered using a Millipore Amicon® series 8000 (model 8400, 400 mL) stirred cell, equipped with a Millipore® YM10 regenerated cellulose ultrafiltration membrane (1,000 nominal molecular weight limit, diameter: 76 mm, cat. no. 13642). The ultrafiltrates so obtained were concentrated by rotary evaporation (typically 15 mbar pressure, 400° C.) to a solution containing 5 to 32% dry wt. solids.

The absorption of the crystal barley malt samples was measured at different wavelengths, using the analytical procedure described herein before. The results obtained are shown in Table 2:

TABLE 2

| Sample | 280 nm | 430 nm | 560 nm | 610 nm | A280/560 |
| --- | --- | --- | --- | --- | --- |
| Barley 1 | 1.025 | 0.011 | 0.000 | 0.000 | 2135 |
| Barley 2 | 1.338 | 0.013 | 0.001 | 0.000 | 2390 |
| Barley 3 | 0.594 | 0.003 | 0.000 | 0.000 | 2968 |

In addition, analyses were carried out to determine the concentrations of Maillard reaction products in the malt samples. The observed concentrations of 5-hydroxymethyl-furfural (HMF), maltol and 2-acetyl pyrrole are recited in Table 3 (in mg per kg of dry matter).

TABLE 3

| Sample | mg/kg DM HMF | mg/kg DM maltol | mg/kg DM 2-Acetyl Pyrrole |
|---|---|---|---|
| Chocolate rye | 19239 | 4299 | 0.6 |
| Caramel rye | 13391 | 1019 | 3.5 |
| Caramel wheat | 19188 | 924 | 1.8 |
| Barley 1 | 2416 | 156 | 0.04 |
| Barley 2 | 6333 | 436 | 2.2 |
| Barley 3 | 53008 | 8078 | 4.3 |

Example 2

The light stabilising properties of the treated malts described in example 1 were compared to the ultra-filtered reference malt by adding the treated malts and the reference to Heineken® pilsner (the Netherlands) in dosage of 20 g/L (dry weight). The composition was added to freshly brewed beer, which was subsequently bottled in a 300 mL green glass bottle (Heineken® export, BSN or Rexam bottle 35.5 EB-5 GR). Bottling was performed in such a way that entrapment of atmospheric oxygen in the beer and headspace was minimised.

The bottles containing the light stabilising composition in the indicated amounts as well as a bottle with a control sample were exposed to simulated sunlight by a Xenon lamp (Atlas Material Testing Technology). The light dose was 2700 KJ/m$^2$ during 60 minutes.

The concentration of MBT in the samples can suitably be determined by means of the method described by Hughes et al. (Hughes P. S., Burke S. and Meacham A. E. (1997) "Aspects of the lightstruck character of beer". Institute of Brewing, Proceedings of the 6th Central and South Africa Section, pp. 123-128).

Analyses of the aforementioned samples showed that the MBT concentration in the samples containing the light stabilising composition was significantly lower than the MBT concentration found in the reference sample as shown in Table 4.

TABLE 4

| | MBT level relative to reference sample |
|---|---|
| Barley 1 | 16% |
| Barley 2 | 9% |
| Barley 3 | 7% |

Example 3

Chocolate rye, caramel rye and caramel wheat malts were kindly provided by Weyermann specialty malting company (Bamberg, Germany).

Samples of the malts (110 g) were ground and mixed with 330 ml of water. After a short extraction period, the malts were centrifuged (15 min at 5000 rpm) and the supernatants were paper filtered. This filtrate, diluted 1:1 (v/v) with milliQ water, was subsequently ultrafiltered over a 1 kD membrane. This filtrate was then concentrated by rotary evaporation at 40° C. to give clear dark orange malt extracts with 4-14% solids (w/w).

The absorption spectra (200-700 nm) of the extracts were determined by a spectrophotometer using the procedure described herein before. The results of these analyses are shown in Table 5.

TABLE 5

| Extract characteristics | caramel wheat | caramel rye | chocolate rye |
|---|---|---|---|
| % solids | 14 | 11 | 4.2 |
| A280 | 5.09 | 5.85 | 5.92 |
| A430 | 0.093 | 0.094 | 0.122 |
| A560 | 0.0079 | 0.0071 | 0.0181 |
| A610 | 0.0047 | 0.0042 | 0.0124 |
| A280/A430 | 55 | 62 | 48 |
| A280/A560 | 642 | 825 | 327 |

Example 4

The extracts (5 ml) obtained in Example 3 were applied to 37 ml Heineken export, and illuminated for 12 minutes, in clear glass vials. MBT-concentrations were determined and checked against a 37 ml Heineken+5 ml water reference. In addition, LAB colour measurements were conducted. The results of these analyses are depicted in Table 6.

TABLE 6

| | Beer colour (1 g/l extract) | | |
|---|---|---|---|
| | Caramel wheat | Caramel rye | Chocolate rye |
| EBC430 (beer: 6.6) MBT experiment | 9.1 | 9.1 | 9.6 |
| MBT relative to control | 12.3% | 9.6% | 13.8% |
| dose (g/l beer) | 16.7 | 13.1 | 5.0 |
| EBC430 (additive effect of the extract) | 38.8 | 30.7 | 15.3 |

Example 5

The light stabilising properties of the following 4 substances were assessed by adding 1 g/l of these substances to Heineken® pilsner (the Netherlands):
Maltol (3-hydroxy-2-methyl-4-pyranone)
Pyrrole-2-carboxaldehyde
Methyl-pyrrole-carboxaldehyde
2-Acetylpyrrole
3,5-dihydroxy-2,3-dihydro-6-methyl-pyran-4-one
5-hydroxymethyl-1-(3-methyl-butyl)-1H-pyrrole-2-carbaldehyde The aforementioned substances were added to freshly brewed beer, which was subsequently bottled in a 300 mL green glass bottle (Heineken® export, BSN or Rexam bottle 35.5 EB-5 GR). Bottling was performed in such a way that entrapment of atmospheric oxygen in the beer and headspace was minimised.

The bottles containing the light stabilising composition in the indicated amounts as well as a bottle with a control sample were exposed to simulated sunlight by a Xenon lamp (Atlas Material Testing Technology). The light dose was 2700 KJ/m$^2$ during 12 minutes.

The concentration of MBT in the samples was determined by means of the method described by Hughes et al. (Hughes P. S., Burke S. and Meacham A. E. (1997) "Aspects of the lightstruck character of beer". Institute of Brewing, Proceedings of the 6th Central and South Africa Section, pp.

123-128). The levels of MBT found in the test samples were compared with the MBT levels found in the control sample. The results are depicted in Table 7.

TABLE 7

| Name | MBT-inhibition[1] (%) |
|---|---|
| Maltol | 20 (2.6) |
| pyrrole-2-carboxaldehyde | 44 (2.0) |
| methyl-pyrrole-carboxaldehyde | 60 (5.2) |
| 2-acetylpyrrole | 35 (4.4) |
| 3,5-dihydroxy-2,3-dihydro-6-methyl-pyran-4-one | 57 |
| 5-hydroxymethyl-1-(3-methyl-butyl)-1H-pyrrole-2-carbaldehyde | 78 (5.0) |

[1]Values in parentheses represent measuring error of duplicate measurements (in %)

These results show that the MBT concentration in the samples containing one of the added substances was significantly lower than the MBT concentration found in the control sample.

The invention claimed is:

1. A method of manufacturing beer that is resistant to light induced flavour changes, comprising:
   (a) obtaining a mixture comprising:
      (i) 0.3-35 wt. % of amino compounds selected from the group consisting of amino acids, peptides, proteins and combination thereof;
      (ii) 10-90 wt. % of carbohydrates, wherein 0.5-80 wt. % of the carbohydrates, by weight of the mixture, comprise one or more reducing sugars selected from the group consisting of maltose, isomaltose, maltotriose, glucose and fructose; and
      (iii) 0-20 wt. % water;
   wherein at least 20 wt. % of the dry components in the mixture are from a cereal selected from the group consisting of barley, wheat, rice, rye, maize, sorghum and combinations thereof;
   (b) heating the mixture to at least 80° C. for at least 10 seconds to obtain a Maillard reaction product, which Maillard reaction product, when dissolved in water at a dry solids content of 0.1 wt. %, exhibits an absorption at 560 nm of at least 0.1;
   (c) subjecting the Maillard reaction product to ultrafiltration to obtain a filtered product, which filtered product, when dissolved in water at a dry solids content of 0.1 wt. %, exhibits:
      i. an absorption at 280 nm ($A_{280}$) that exceeds 0.01; and
      ii. an absorption ratio $A_{280/560}$ of at least 200,
   wherein the filtered product contains less than 30%, by weight of dry matter, of components having a molecular weight in excess of 30 kDa and comprises:
      (A) at least 30% cereal derived matter by weight of dry matter;
      (B) at least 10 µg of substituted pyrroles per kg of dry matter, said substituted pyrroles being represented by the following formula:

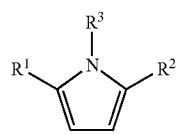

wherein $R^1$ represents an optionally oxygenated hydrocarbyl comprising 1-6 carbon atoms; $R^2$ represents hydrogen or an optionally oxygenated hydrocarbyl comprising 1-6 carbon atoms; and $R^3$ represents hydrogen or a linear or branched $C_1$-$C_5$ alkyl residue; and
      (C) at least 100 mg per kg of dry matter of a pyranone selected from the group consisting of maltol, 2,3-dihydro-3,5-dihydroxy-6-methyl-4H-pyran-4-one and combinations thereof; and
   (d) adding between 0.01 and 5 wt. %, based on the amount of dry matter being added, of the filtered product to a beer.

2. The method according to claim 1, wherein the composition contains at least 50 µg of the substituted pyrroles per kg of dry matter.

3. The method according to claim 1, wherein the composition comprises at least 500 mg per kg of dry matter of a pyranone selected from the group consisting of maltol, 2,3-dihydro-3,5-dihydroxy-6-methyl-4H-pyran-4-one and combinations thereof.

4. The method according to claim 1, wherein $A_{280}$ exceeds 0.05.

5. The method according to claim 1, having an absorption ratio $A_{280/560}$ of at least 200.

6. The method according to claim 1, wherein $R^1$ represents an oxygenated hydrocarbyl comprising 1-6 carbon atoms.

7. The method according to claim 6, wherein $R^1$ represents an oxygenated hydrocarbyl comprising 1-4 carbon atoms.

8. The method according to claim 6, wherein $R^1$ represents —(CO)CH$_3$ or —CHO.

9. The method according to claim 8, wherein $R^1$ represents —(CO)CH$_3$.

10. The method according to claim 8, wherein $R^1$ represents —CHO.

11. The method according to claim 1, wherein $R^2$ represents hydrogen, $C_1$-$C_2$ alkyl or an oxygenated hydrocarbyl comprising 1-2 carbon atoms.

12. The method according to claim 11, wherein $R^2$ represents hydrogen, methyl or —CH$_2$OH.

13. The method according to claim 12, wherein $R^2$ represents hydrogen.

14. The method according to claim 12, wherein $R^2$ represents —CH$_2$OH.

15. The method according to claim 1, wherein $R^3$ represents hydrogen, methyl or —CH$_2$CH$_2$CH(CH$_3$)CH$_3$.

16. The method according to claim 15, wherein $R^3$ represents hydrogen.

17. The method according to claim 15, wherein $R^3$ represents methyl.

18. The method according to claim 15, wherein $R^3$ represents —CH$_2$CH$_2$CH(CH$_3$)CH$_3$.

19. The method according to claim 1, wherein the composition comprises at least 1,000 mg of 2,3-dihydro-3,5-dihydroxy-6-methyl-4H-pyran-4-one per kg of dry matter.

20. The method according to claim 19, wherein the composition comprises at least 5,000 mg of 2,3-dihydro-3,5-dihydroxy-6-methyl-4H-pyran-4-one per kg of dry matter.

21. The method according to claim 1, wherein the composition comprises at least 100 mg of maltol per kg of dry matter.

22. The method according to claim 21, wherein the composition comprises at least 500 mg of maltol per kg of dry matter.

23. The method according to claim 1, wherein the composition comprises at least 1 µg of 5-hydroxymethyl-1-(3-methyl-butyl)-1H-pyrrole-2-carbaldehyde per kg of dry matter.

24. The method according to claim 23, wherein the composition comprises at least 3 μg of 5-hydroxymethyl-1-(3-methyl-butyl)-1H-pyrrole-2-carbaldehyde per kg of dry matter.

25. The method according to claim 1, wherein the composition comprises at least 0.1% of reducing sugars by weight of dry matter.

26. The method according to claim 1, wherein the composition is water soluble.

27. The method according to claim 1, wherein the composition comprises less than 20%, by weight of dry matter, of components having a molecular weight in excess of 30 kDa.

28. The method according to claim 1, wherein the composition comprises less than 30%, by weight of dry matter, of components having a molecular weight in excess of 5 kDa.

29. The method according to claim 1, wherein the solids content of the composition is at least 10 wt. %.

30. The method according to claim 29, wherein the solids content of the composition is at least 20 wt. %.

31. The method according to claim 30, wherein the solids content of the composition is at least 30 wt. %.

32. The method according to claim 1, wherein said composition comprises at least 50% cereal derived matter by weight of dry matter.

33. The method according to claim 1, wherein the composition is introduced into beer in an amount of between 0.01 and 5 wt. %, calculated on the basis of the amount of dry matter introduced.

34. The method according to claim 33, wherein the composition is introduced into the beer in an amount of between 0.02 and 3 wt. %, calculated on the basis of the amount of dry matter introduced.

35. A beer that is resistant to light induced flavour changes, wherein the beer is obtained by a method according to claim 1.

* * * * *